(12) United States Patent
Hahn et al.

(10) Patent No.: US 7,894,529 B2
(45) Date of Patent: Feb. 22, 2011

(54) METHOD AND DEVICE FOR DETERMINING MOTION VECTORS

(75) Inventors: Marko Hahn, Neubiberg (DE); Peter Rieder, Munich (DE); Günter Scheffler, Munich (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1301 days.

(21) Appl. No.: 11/444,976

(22) Filed: Jun. 1, 2006

(65) Prior Publication Data

US 2006/0274834 A1 Dec. 7, 2006

(30) Foreign Application Priority Data

Jun. 3, 2005 (DE) .................. 10 2005 025 634

(51) Int. Cl.
H04N 7/12 (2006.01)
(52) U.S. Cl. ........................ 375/240.16; 375/240.29
(58) Field of Classification Search ............ 375/240.14, 375/240.16, 240.24, 240.29; 348/441, 155, 348/699
See application file for complete search history.

(56) References Cited

U.S. PATENT DOCUMENTS

| | | | |
|---|---|---|---|
| 4,771,331 A | 9/1988 | Bierling et al. ............. 358/136 |
| 5,027,203 A * | 6/1991 | Samad et al. ............... 348/441 |
| 5,148,269 A * | 9/1992 | de Haan et al. ............. 348/699 |
| 5,608,458 A * | 3/1997 | Chen et al. ............. 375/240.14 |
| 6,421,383 B2 | 7/2002 | Beattie ............................. 7/36 |
| 6,782,054 B2 | 8/2004 | Bellers ................... 375/240.27 |
| 2004/0027454 A1* | 2/2004 | Vella et al. .................. 348/155 |

OTHER PUBLICATIONS

H. Schröder, "Mehrdimensionale Signalverarbeitung," Band 2, ISBN: 3-519-06197-X, pp. 259-266.
Schröder et al. "Multidimensional Signal Processing" [Mehrdimensionale Signalverarbeitung], vol. 2, ISBN: 3-519-06197-X, p. 266-289, Dec. 2000.
Schröder et al. "Multidimensional Signal Processing", vol. 2, ISBN: 3-519-06197-X, p. 266-289 Verification of Translation, Dec. 2000.

* cited by examiner

Primary Examiner—Gims S Philippe
(74) Attorney, Agent, or Firm—DLA Piper LLP (US)

(57) ABSTRACT

An image to be interpolated is subdivided into a number of image blocks and a motion estimation technique is implemented to provide at least one initial motion vector for each of the image blocks. A modified motion vector is generated for each image block based on the initial motion vectors assigned to the individual image blocks. At least one additional image block is determined through which the motion vector assigned to the given image block passes at least partially, and the modified motion vector is generated as a function of the initial motion vector that is assigned to this at least one additional image block.

20 Claims, 5 Drawing Sheets

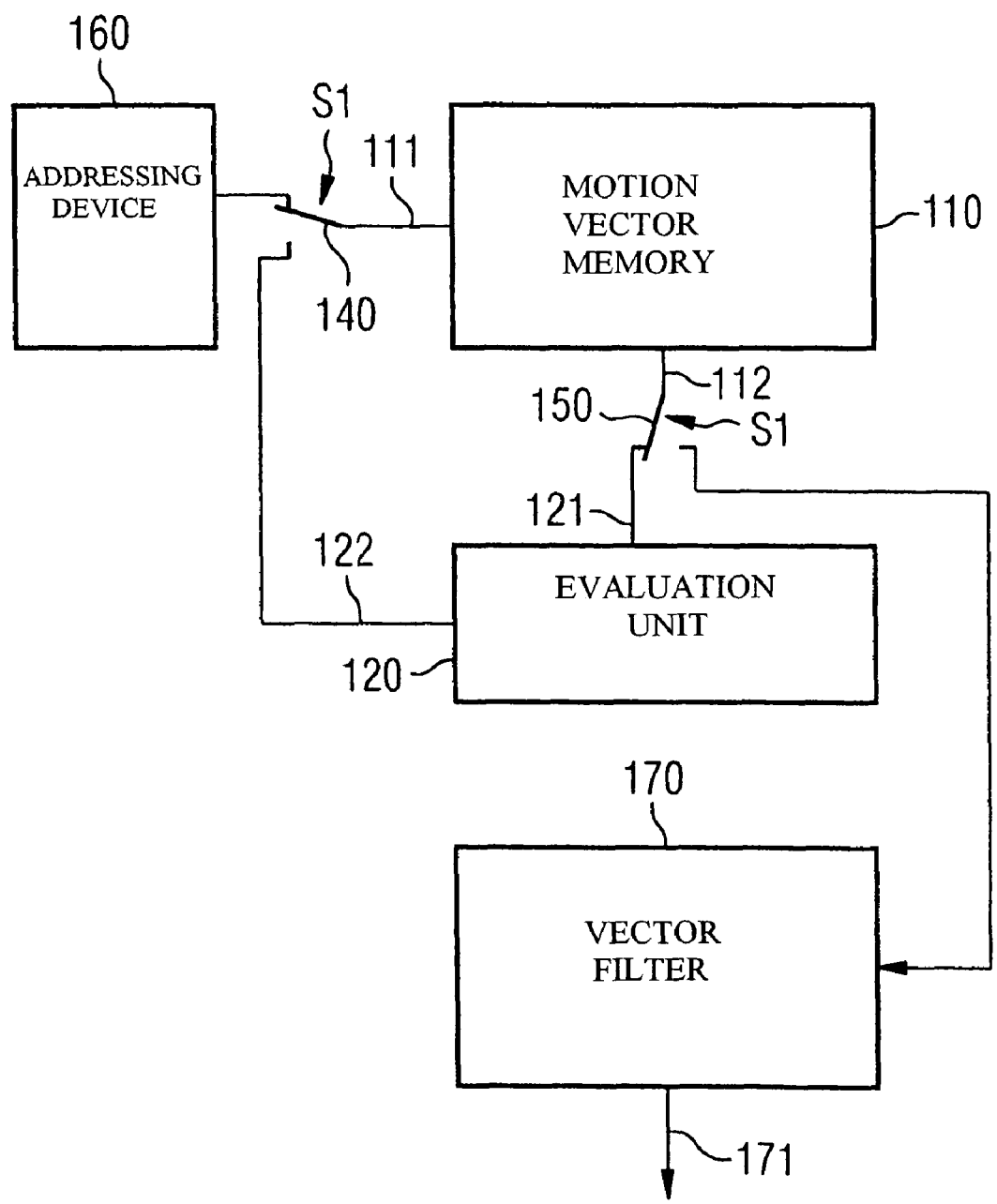

METHOD AND DEVICE FOR DETERMINING MOTION VECTORS

PRIORITY INFORMATION

This patent application claims priority from German patent application 10 2005 025 634.1 filed Jun. 3, 2005, which is hereby incorporated by reference.

BACKGROUND OF THE INVENTION

This invention relates to the field of image/video processing, and in particular to determining motion vectors that are each assigned to individual image regions.

In image processing, a known approach is to assign motion vectors to individual image regions of an image, which is part of a sequence of images. The motion vectors each indicate a displacement of the position of this image region relative to a position for this image region in a previous or subsequent image of the image sequence. The motion information is useful, for example, in generating one or more intermediate images lying temporally between the images of the image sequence in order to correctly display the positions of moving objects in the intermediate images (i.e., displaying them with correct motion). The motion information for an object moving over multiple successive images may also be employed for the compressed storage of image data for successive images. In addition, the motion information for a moving object can also be utilized for an interline interpolation.

Motion vectors can also be assigned to image blocks of an intermediate image to be interpolated. The motion vector of an image block of an intermediate image in this case indicates from which image position in the previous image the content of this image block moves to which image position in the subsequent image.

One technique for generating motion vectors is the so-called block matching method which is described, for example, in Schröder, H.; Blume, H.: "*Multidimensional Signal Processing*", Volume 2, ISBN 3-519-06197-X, pages 259-266. In this processing technique, the current image from an image sequence is subdivided into a number of blocks of equal size. For each of these blocks, a block whose content has the best match with the specific block of the current image is sought in the previous or subsequent image. The displacement vector between this block from the current image and the block from the previous or subsequent image which has the greatest number of matches with this block of the current image then forms the motion vector for the block of the current image. An estimation technique of this type for determining motion vectors is explained below based on FIG. 1. FIG. 1 illustrates an image sequence comprising a first image P(k−½) and a second image P(k+½) which follow each other either temporally or spatially, and comprising an intermediate image P(k) to be interpolated lying temporally or spatially between the first and second images.

Referring to FIG. 1, to implement motion estimation, the first image P(k−½) is subdivided into a number of image blocks using an image grid, indicated by the broken line. One such image block is identified in FIG. 1 by reference number 51. Each of these image blocks comprises a pixel matrix with a number of pixels, such as for example 4×8 pixels. Using an appropriate search algorithm, for each block of the first image Pk(k−½) the image block of the same size in the second image Pk(k+½) is determined that has the greatest number of matches with the respective image block of the first image. In FIG. 1, reference number 52 identifies one such image block in the second image P(k+½) corresponding to the image block 51 of the first image.

This search for the corresponding image block 52 within the second image is not necessarily tied to the image grid, with the result that the position of the corresponding image block may lie outside the block grid specified for the first image P(k−½). The search for the corresponding image block in the second image can be effected with a resolution of one pixel.

For purposes of interpolation, the intermediate image to be interpolated is also subdivided, using a block grid that can correspond to the block grid of the first image P(k−½), into a number of image blocks to which one motion vector each is assigned. Reference notation 154 in FIG. 1 identifies one such image block. A motion vector V154 is assigned to the image block 154. The image content of the image block 154 can be interpolated using the motion vector by first determining the image block located in the first image P(k−½) at the position of the starting point of the motion vector V154 and by determining the image block in the second image P(k+½) that is located at the position of the end point of the motion vector V154. The image content of the image block 154 of the intermediate image P(k) to be interpolated can then be interpolated using the image information of these image blocks from the first and second images P(k−½), P(k+½).

The temporal or spatial position of the intermediate image P(k) between the first and second image must be taken into account in the assignment of motion vectors to the individual image blocks 154. For example, effect this assignment of motion vectors to image blocks of the intermediate image, the motion vectors V51 determined for the individual image blocks of the first image P(k−½) are projected into the intermediate image, and for each of these motion vectors V51 one pixel 53 lying on the motion vector V51 is determined. The local position of which between the starting point and end point of the motion vector V51 corresponds to the temporal or local position of the intermediate image P(k) between first and second images P(k−½), P(k+½). If the intermediate image P(k), for example, lies temporally midway between the first and second images P(k−½), P(k+½), then that pixel is determined which lies in the center of the motion vector, as shown in FIG. 1. The motion vector V51 is then assigned as the motion vector V154 to the image block 154 in which the determined pixel 53 lies. In FIG. 1, the motion vector V154 is shown as motion vector V154 proceeding through the midpoint of the image block.

In the motion estimation technique based on the full search algorithm, each block of the current image is compared with each block of the previous or subsequent image to determine the motion vectors of the individual regions. To reduce the considerable computational effort required for the full search algorithm, additional predictive estimation techniques are known in which motion information from prior motion estimates is utilized when determining the motion vector for a specific block.

With optimized search techniques, only a certain number of selection vectors or candidate vectors are assigned to each block. When using these selection vectors or candidate vectors, an image comparison is performed to select one of these vectors based on the comparison result, and to assign it to the block. Methods of this type are described in Schröder, H.; Blume, H.: "Multidimensional Signal Processing" [*Mehrdimensionale Signalverarbeitung*], Volume 2, ISBN 3-519-06197-X, pages 266-289. Another optimized search method using candidate vectors is described, for example, in U.S. Pat. No. 6,782,054.

The quality of the motion estimate using the block estimation technique is significantly dependent on the block resolution, that is, the size of the individual blocks. For example the quality increases as the size of the individual blocks decreases, in other words, as the resolution of the image in the individual blocks improves, and thus more motion vectors per image are determined. However, at the same time, the computational effort also increases with smaller block sizes. The susceptibility to errors also increases with decreasing block sizes. The optimum block size is thus approximately 4×8 (lines×pixels). However, with blocks of this size noticeable block structures are created during image processing. For example, when a round object moves in the image in front of a background, the block estimation can result in noticeable edges at the boundary of the object relative to the background.

One approach to increasing the resolution for the determination of motion vectors is known from U.S. Pat. No. 5,148,269, whereby the image is subdivided into a predetermined number of main blocks and a block estimate is first implemented to assign a motion vector to each of these main blocks. Each of the individual main blocks is then subdivided into a number of sub-blocks to which one motion vector each is assigned. The motion vector of the associated main block, and motion vectors of additional main blocks adjacent to the main block, are utilized to generate the motion vectors of the sub-blocks.

Another problem in the determination of motion vectors is that a motion vector can be assigned only to those image regions or objects that are actually present in successive images. Consider the case of an image sequence with an object that moves toward a boundary of the image sequence and is present in the first image of the image sequence, but is no longer present in a temporally following image. A motion estimation approach using a block estimation method in this case leads with a high degree of probability to an error. An analogous situation applies whenever an image sequence displays moving objects that are temporarily obscured by other objects in the image sequence.

Motion estimation is especially difficult whenever the image sequence has objects moving in opposite directions that obscure each other temporarily.

There is a need for an improved technique for determining motion vectors that are assigned to individual image regions of an image to be interpolated.

SUMMARY OF THE INVENTION

An image to be interpolated is subdivided into a number of image blocks and a motion estimation technique is implemented to provide at least one initial motion vector for each of the image blocks. The motion estimation technique used for this purpose may be a conventional one, for example, one of the motion estimation methods described in the introduction. A modified motion vector is generated for each image block based on the motion vectors assigned to the individual image blocks. At least one additional image block is determined through which the motion vector assigned to the given image block passes at least partially, and the modified motion vector is generated as a function of the motion vector that is assigned to this at least one additional image block.

The motion information can also be utilized to generate the modified motion vector that has been determined for other image blocks. The positions of these image blocks whose motion information is being utilized is dependent on the motion vector that was first determined for a given image block. The motion information of other image blocks is incorporated in the determination of the modified motion vector for those image blocks for which the initially determined motion vector points beyond the boundaries of this image block.

To generate the modified motion vector for one image block, one embodiment determines the image blocks through which the motion vector of this image block passes, and runs the motion vectors of all these image blocks through a filter (e.g., a low-pass filter) to obtain the modified motion vector.

A technique of the present invention may increase the resolution during the motion estimation. Starting with a subdivision of the image into image blocks and an assignment of at least one motion vector to each of the image blocks, each of the image blocks is divided into sub-blocks and the motion vector of the image block is assigned to each of the image blocks. Subsequently, for each sub-block at least one additional image block or sub-block is determined through which the motion of this sub-block passes, and a modified motion vector is determined as a function of the motion vector of the at least partially traversed image block or sub-block. The modified motion vector is then assigned as the motion vector to the respective sub-block.

This procedure can be implemented repeatedly whereby each sub-block for which a modified motion vector has been generated is further subdivided into smaller sub-blocks, and the previously explained steps for generating a modified motion vector are implemented for each of these smaller sub-blocks.

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 7 is a block diagram illustration of a device for determining motion vectors.

DETAILED DESCRIPTION OF THE INVENTION

Figure 1:
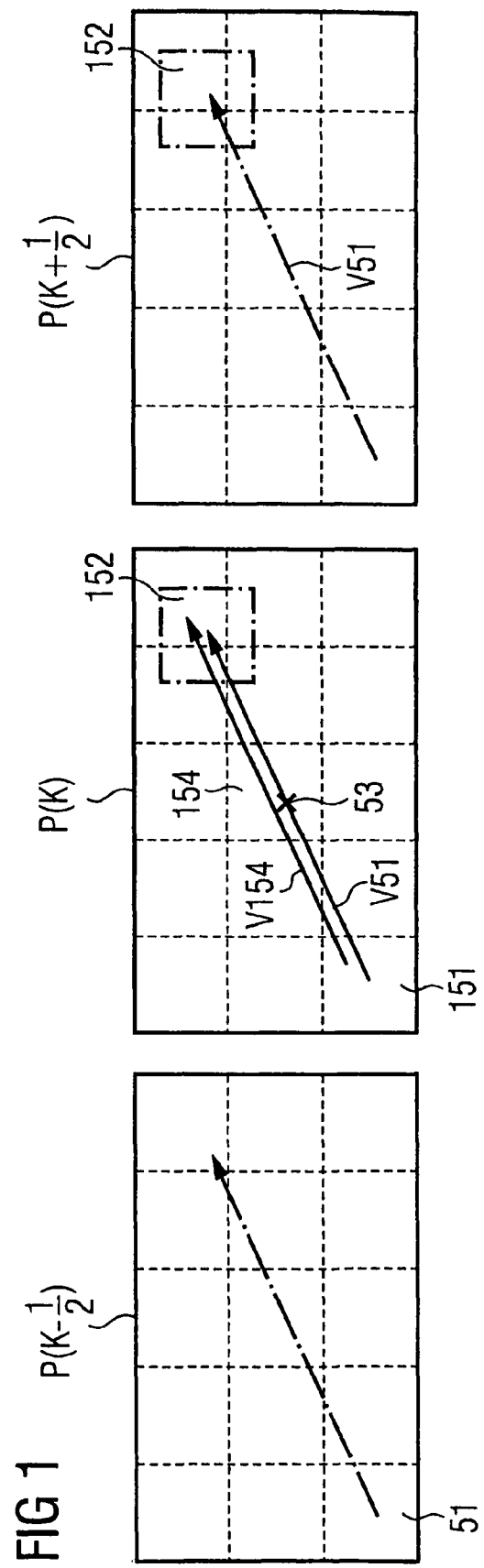
FIG. 1 pictorially illustrates a known technique for determining a motion vector for an image block of an image.
Figure 2:
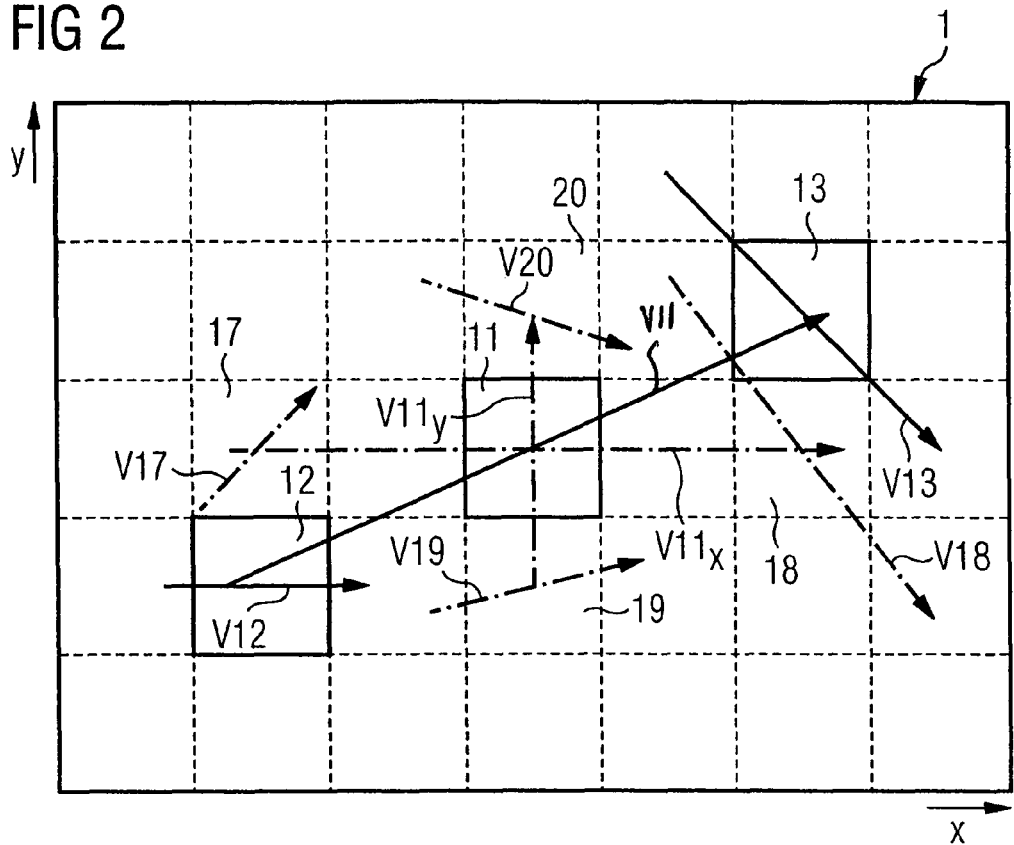
FIG. 2 pictorially illustrates a segment of an image subdivided into image blocks according to an aspect of the invention.

FIG. 2 pictorially illustrates a segment of an image 1 subdivided into individual image blocks, wherein motion vectors are assigned to each of the individual image blocks. The subdivision of the image 1 into individual image blocks is shown by broken lines in FIG. 2. The following discussion considers three of the image blocks, 11, 12, 13 in more detail. The image blocks 11, 12, 13 are shown by continuous lines in FIG. 2.

At least one motion vector each is assigned to the individual image blocks of the image 1. Each of the image blocks 11-13 includes an associated motion vector, V11-V13, respectively. In the interest of clarity, the motion vectors for the image blocks in the image 1 other than the image blocks 11-13 are not shown.

The image 1 is part of an image sequence of multiple successive images. For example, the image 1 may be is an intermediate image to be interpolated lying temporally or spatially between two images (not shown). The motion vector assigned to one image block contains the information to be utilized for the interpolation of the image content of the image block from the intermediate image. The motion vectors V11, V12, V13 assigned to the image blocks 11, 12, 13, respectively, and thus to all the pixels of an image block, is shown in FIG. 2 as a motion vector passing through the midpoint of the respective image block. It is assumed for purposes of explanation that the image 1 is an intermediate image that must be interpolated temporally or spatially midway between two images. The midpoint of the image blocks 11, 12, 13 to which the respective motion vectors V11, V12, V13 is assigned lies at the center of the respective motion vectors V11, V12, V13.

Determination of the initial motion vectors assigned to the individual image blocks may be implemented by conventional motion estimation techniques designed to assign motion vectors to individual image blocks of an image. The motion estimation that has produced the motion vector V11 may, however, contain errors. On the other hand, the motion vectors assigned to the individual image blocks of the image continue to be processed in order to reduce the effects of possible errors in the previously effected motion estimation. A modified motion vector is determined for each image block, for example as explained below for the first image block 11 illustrated in FIG. 2.

The motion vector V11 is assigned to the first image block 11. The vector V11 has a starting point and end point, the end point of the motion vector V11 being identified in FIG. 2 by an arrow. In this example, the starting point of the first motion vector V11 lies within the second image block 12, while the end of the motion vector V11 lies within the third image block 13. According to an aspect of the invention, the modified motion vector for the first motion vector V11 is generated as a function of the motion vector of at least one additional image block which the first motion vector at least partially traverses.

A modified motion vector associated with motion vector V11 is generated using the motion vectors V12, V13 of the second and third image blocks lying at the start and end of the motion vector V11. Generation of this modified motion vector can be implemented, for example, by generating the mean value of the motion vectors V12, V13 assigned to the image blocks 12, 13.

The individual motion vectors each have a horizontal component (i.e., x component) and a vertical component (i.e., y component). These x and y components of the individual motion vectors are identified below and in FIG. 2 by the subscripts x and y, respectively. The individual components of the vectors are indicated below in parentheses so that the component notation is shown—for example for the vector V11 as: $(V11_x, V11_y)$.

When using mean value generation to generate a modified motion vector V11' for the image block 11, the applicable may be expressed as:

$$V11'_x = (V12_x + V13_x)/2 \tag{1a}$$

$$V11'_y = (V12_y + V13_y)/2 \tag{1b}$$

The terms $V11'_x$ and $V11'_y$ denote the components of the modified motion vector, while $V12_x$, $V12_y$, $V13_x$, $V13_y$ denote the components of the first and second motion vectors V12, V13.

In an alternative embodiment of this filtering technique, the first motion vector V11 assigned to the first image block 11 is split into its two motion components $V11_x$, $V11_y$, and the above-described generation of a modified motion vector is effected component-by-component—as will be explained below, also based on FIG. 2.

The two components $V11_x$, $V11_y$ of the first motion vector V11 are shown in FIG. 2 as a dot-and-dash line. The x motion component $V11_x$ of the motion vector V11 runs from image block 17, which forms the starting image block of the x motion component, to image block 18 which forms the end image block of the x component $V11_x$. The y motion component $V11_y$ of the motion vector V11 runs from image block 19, which forms the starting image block of the y motion component, to image block 20 that forms the end image block of this y component $V11_y$.

The modified motion vector V11" may be determined component-by-component, wherein to determine an x component $V11''_x$ of this modified motion vector V11" the x components of the motion vectors for those blocks are utilized through which the x motion component of the motion vector V11 passes. Analogously, to determine the y component $V11''_y$ of the modified motion vector V11" the y components of the motion vectors of those blocks are utilized through which the y motion component of the motion vector V11 passes.

In the event the mean value of the respective components of the motion vectors for the starting and ending image blocks are used to generate the modified motion vector, the applicable relationship for the components of this modified motion vector V11" may be expressed as:

$$V11''_x = (V17_x + V18_x)/2 \tag{2a}$$

$$V11''_y = (V19_y + V20_y)/2 \tag{2b}$$

The terms $V17_x$ and $V18_x$ denote the x components of the motion vectors for the starting and the ending image blocks 17, 18 of the x component of the vector V11, while $V19_y$ and $V20_y$ denote the y components of the motion vectors for the starting and ending image blocks 19, 20 of the y component of the vector V11. In the interest of clarity the motion vectors V17, V18, V19, V20 in x and y components are not shown.

The described technique is preferably implemented for each of the image blocks of the image 1 to generate a modified motion vector for each image block. The modified motion vectors can be utilized analogously to the initial motion vectors determined by conventional motion estimation methods for further image processing. These additional image processing measures comprise, for example, an intermediate image interpolation. Motion vectors can also be employed using the known approach for interline interpolation.

In addition to the previously described generation of the mean value for the motion vectors of the starting and ending image blocks, more-complex filter techniques may also be used to generate the modified motion vector, as explained below based on FIG. 3.

Figure 3:
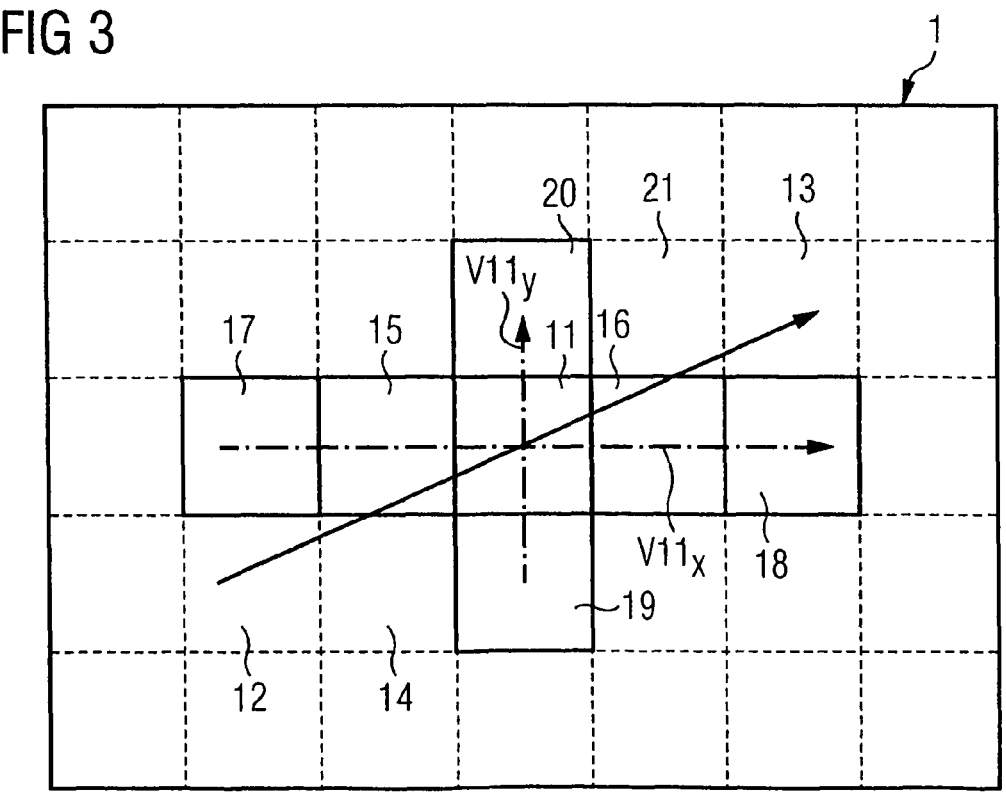
FIG. 3 pictorially illustrates a segment of an image subdivided into image blocks according to an aspect of the invention.

FIG. 3 pictorially illustrates the segment, already described for FIG. 2, of the image 1 divided into image blocks, wherein motion vectors are each assigned to the individual image blocks. Based on this figure, the following discussion explains the generation of a modified motion vector for the first image block 11 to which the motion vector V11 is assigned. Initially all the image blocks are determined which the first motion vector V11 at least partially traverses or passes over. In the example shown, the starting point of the motion vector V11 lies in the image block 12, which thus forms the starting image block of the motion vector V11. The end point of the motion vector V11 lies in the image block 13 which is thus assigned to the end image block which thus forms the end image block of this motion vector V11. In addition to these starting and ending image blocks 12, 13, respectively, the image block 11 to which this motion vector V11 is assigned, the motion vector V11 passes, in the example, through the additional image blocks 14, 15, 16, 21. Motion vectors V14, V15, V16, V21 are assigned to associated image blocks 13, 15, 16 and 21, respectively. In the interest of ease of illustration and clarity, the motion vectors V14, V15, V16 and V21 are not illustrated.

The modified motion vector V11' is generated as a function of the motion vectors of the image blocks 12, 13, 14, 15, 16, 21 through which the motion vector V11 passes. In general, the relationship may be expressed as:

$$V11'=f(V11,V12,V13,V14,V15,V16,V21) \quad (3).$$

The term f(.) denotes a filter function. The filter is preferably a low-pass filter which in a simple case can be generation of a mean value. Also suitable are nonlinear filters such as, for example, statistical filters (e.g., minimum/maximum filter, median filter, etc.). In this filter, the motion vectors of all the image blocks can be utilized through which the motion vector passes. However, it is also possible to utilize only the motion vectors of individual selected image blocks. To the image blocks through which the motion vector V11 passes, within the context of the invention, also belong the first image block 11 to which the first motion vector V11 is assigned, as well as the starting and ending image blocks. The first motion vector V11 can also be taken into account when generating the modified motion vector.

The filtering of the motion vectors to generate the modified motion vector is implemented component-by-component, wherein the approach already described can proceed using various different methods.

For example, in a first method, the image blocks are determined through which the motion vector V11 of the image block passes. In order to generate the x component $V'_x$ of the modified motion vector, the x components of the motion vectors assigned to these image blocks are employed, while to generate the y component $V'_y$ of the modified motion vector the y components of the motion vectors assigned to these image blocks are employed. For the example of FIG. 3, the relationship may be expressed as:

$$V11'_x=f(V11_x,V12_x,V13_x,V14_x,V15_x,V16_x,V21_x) \quad (4a)$$

$$V11'_y=f(V11_y,V12_y,V13_y,V14_y,V15_y,V16_y,V21_y) \quad (4b).$$

In a second method for determining the x and y components of the modified motion vector V11', the motion vector assigned to the image block is divided into its x and y components $V11_x$, $V11_y$, and those image blocks are determined through which these vector components or sub-vectors pass. In the example of FIG. 3, the x component itself passes through, aside from the image block 11 itself, the image blocks 19, 20. The y component $V11_y$ passes through, aside from the image block 11 itself, the image blocks 15, 16, 17, 18.

In this embodiment, the x component $V11'_x$ of the modified motion vector V11' is generated as a function of the x components, that is, dependent upon the x components of the motion vectors of the blocks through which the x component $V11_x$ of the motion vector V11 passes. In this embodiment, the y component $V11'_y$ is generated as a function of the y components, that is dependent on the y components of the motion vectors of the blocks through which the y component $V11_y$ of the motion vector V11 passes. The applicable relationship for the example of FIG. 3 may be expressed as:

$$V11'_x=f(V11_x,V15_x,V16_x,V17_x,V18_x) \quad (5a)$$

$$V11'_y=f(V11_y,V19_y,V20_y) \quad (5b).$$

This last-described technique may also be interpreted to the effect that two mutually orthogonal motion vectors—$V11_x$, $V11_y$ in the example—are assigned to each image block, and that for each image block two mutually orthogonal motion vectors are determined. To this end, for each of the motion vectors of an image block the image blocks traversed by this vector are determined, and the motion vectors of the traversed image blocks that are not orthogonal relative to the given traversed motion vector are filtered.

A filter having a low-pass quality is, in particular, appropriate as a filter for generating the modified motion vector from the motion vectors of the remaining image blocks. In one embodiment, a median filter may be employed as the filtering mechanism.

The modified motion vector generated according to an aspect of the present invention deviates from the motion vector initially assigned to the image block only when the image block is considered to be moving, that is, when the motion vector assigned to the image block extends beyond the boundaries of the image block, and when the motion vectors of the starting and ending image blocks of the motion vector differ from the motion vector of the examined image block. Image blocks which were determined by the initially implemented motion estimation method to be "unmoving" image blocks remain unmoving image blocks even after implementation of the filter.

The motion vectors of the image blocks that are part of a multiple-image-block-comprising, uniformly-moving image region are also unaffected by the described filter technique. This is because in such a homogeneous, uniformly moving region in which adjacent image blocks have the same motion vectors the same motion vectors are also assigned to the starting and the ending image blocks of the motion vectors, with the result that the described filter technique—in particular, a low-pass filter—yields the same motion vector as already assigned to the individual image blocks. The described technique may, however, result in a modification of the motion vectors of those image blocks which lie along the boundary between those image regions that move differently, as explained below based on FIG. 4.

Figure 4:
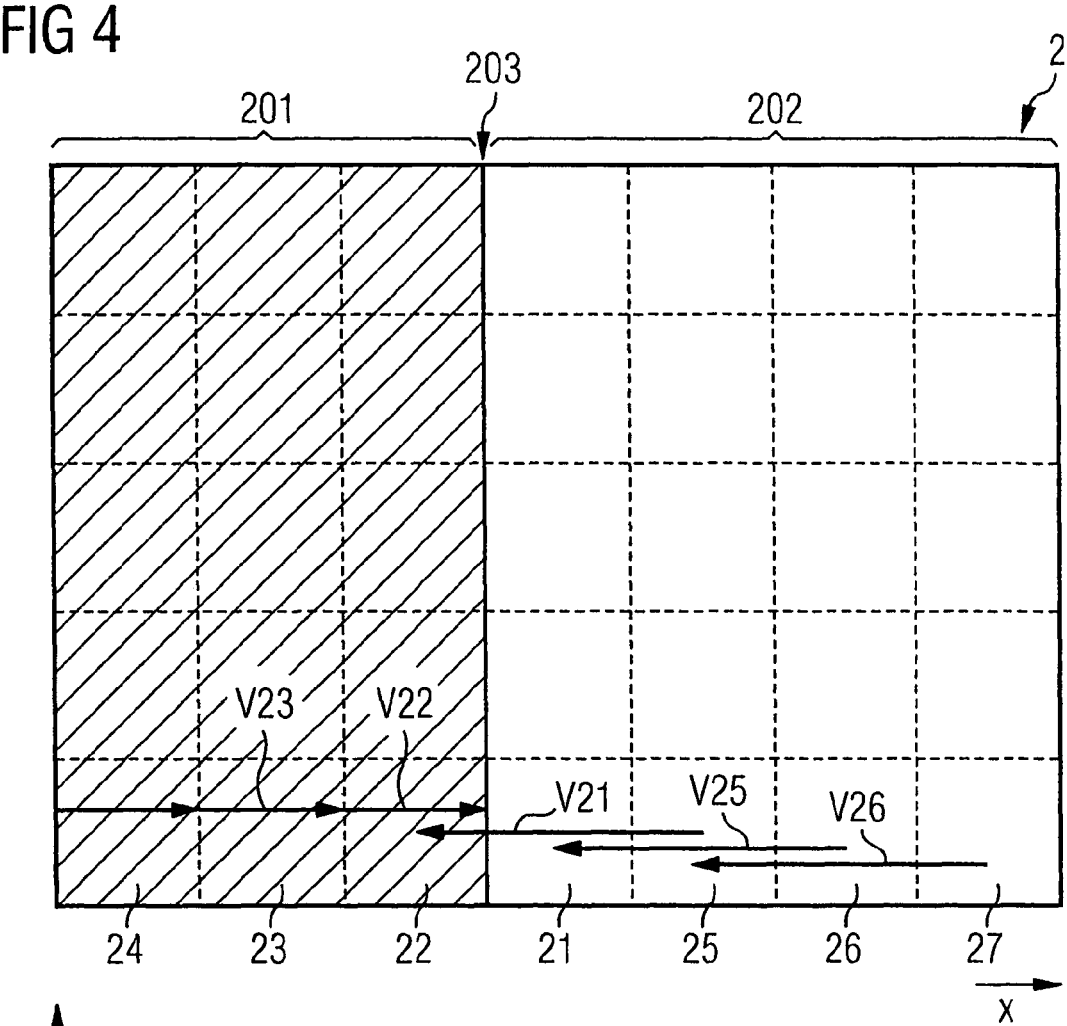
FIG. 4 illustrates a segment of an image subdivided into image blocks and a diagram with absolute values of the motion vectors assigned to the individual image blocks in order to elucidate a method according to an aspect of the invention.

FIG. 4 illustrates a segment of an image 2 divided into image blocks, which image has two image segments 201, 202, moving in opposite directions. In the example, these two image regions 201, 202 are horizontally adjacent to each other so that a boundary or edge 203 runs vertically between these two image segments.

For purposes of explanation, let us assume that the first image region 201 is moving horizontally or in the x axis of the image 2, while the second image region 202 is moving in a direction opposite to the first image region 201. Here the respective same motion vectors are assigned to the individual image blocks of the first image region 201, which vectors in the example have only an x component. Analogously, the respective same motion vectors are also assigned to the image blocks of the second image region 202, which vectors in the example also have only an x component.

Furthermore, let us examine a number of the image blocks 21-27 that lie horizontally adjacent to each other in the image 2. The edge 203 between the first and second image regions 201, 202 runs between the image blocks 21, 22. Below the examined image blocks 21-27 in FIG. 4, the absolute values for the motion vectors of the individual image blocks are plotted in a graph by continuous lines. In the example, it is assumed that the "speed" at which the first region 201 is moving is less than the speed of the second image region 202, that is, that the absolute values for the motion vectors of the image blocks 22, 23, 24 of the first image region 201 are less than the absolute values of the motion vectors of the image blocks 21, 25, 26, 27 of the second image region 202.

In FIG. 4, the absolute values for the motion vectors of the image blocks 21-27 are shown as dot-and-dash lines. These modified motion vectors are generated in the example by generating the mean values of the starting and ending image blocks. Modified motion vector V21' of the image block 21 that lies on the boundary 203 between oppositely moving first and second regions 201, 202 is thus obtained as the mean of motion vectors V25, V22 of the starting image block 25 and the ending image block 22. The motion vectors V25, V22 of the starting and ending image blocks differ and run in opposite directions, with the result that the modified motion vector V21', which in the example is identical to its x component $V21'_x$, deviates from the originally assigned motion vector V21. The modified motion vectors of the remaining image blocks 25, 26, 27 of the second image region 202 match the original motion vectors since the motion vectors of the starting and ending image blocks match the motion vectors originally assigned within these regions. For the image block 25, the adjacent image block 26 forms the starting image block, while the other adjacent image block 21 forms the ending image block. Motion vectors V21, V26 of these image blocks match the motion vector V25 of the image block 25.

In the example, the modified motion vectors of the image blocks 22, 23, 24 of the first image region 201 match the modified motion vectors since in the example these motion vectors do not extend beyond the respective image blocks.

Referring to FIG. 4, the described filter technique may result in a modification of the motion vectors of those image blocks that border on differently moving image regions. In order to generate the modified motion vectors, a low-pass filter is preferably employed as the filter, such as for example, a simple mean-value generation, which results in the modified motion vector's being matched to the motion vectors of the image blocks which in the direction of motion are adjacent to the examined image block. In the example illustrated in FIG. 4 in which the image blocks 22, 25 lying adjacent in the direction of motion to the image block 21 have motion vectors which both are of differing length and have opposite directions, the modified motion vector V21' is noticeably shorter than the original motion vector V21.

Given the assumption that the originally implemented motion estimation resulting in the assignment of the original initial motion vectors to the image blocks 21, 27 was error-free, the generation of the modified motion vector which results in a shortening of the motion vector of the image block 21 produces an error. However, frequently it is precisely for such image regions in which the boundaries of differently moving regions run that conventional motion estimation techniques are faulty. It is at the boundaries of these differently moving regions that a faulty motion estimation adversely affects the quality of the displayed image. Proceeding from the assumption that there is this faulty motion estimation, in those image regions in which the motion vectors of adjacent image blocks significantly deviate from each other using a low-pass filter results in a adjustment of the motion vectors of adjacent image blocks, and provides a significant improvement of the subjective visual impression.

The described technique has an especially advantageous on those image blocks for which originally a "high speed" was determined, that is, those to which motion vectors were assigned that significantly extend beyond the boundaries of the examined image block. On the other hand, those image blocks originally having a low speed, or stationary image blocks, are not modified since for these image blocks the starting point and end point of the motion vector lie within the examined image block.

In the described technique, a filter may be implemented to generate the modified motion vectors fundamentally only in the direction of motion. Vector field components orthogonal to the direction of motion are not affected by this technique, as explained below.

Figure 5:
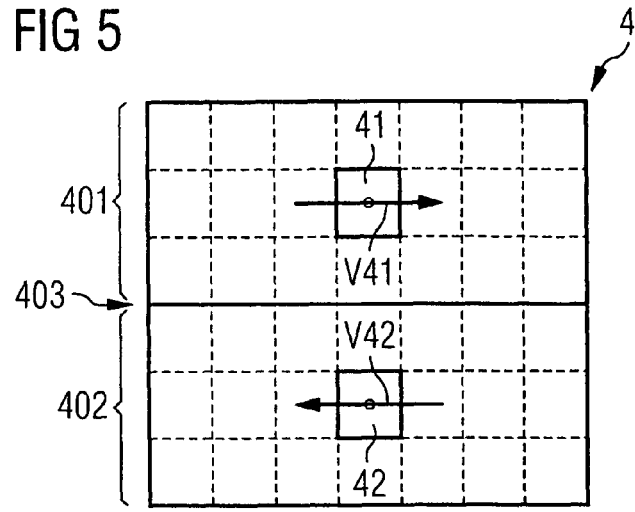
FIG. 5 pictorially illustrates a segment of an image subdivided into image blocks having two image regions moving in opposite directions.

FIG. 5 pictorially illustrates a segment of an image 4 subdivided into image blocks. The image has two differently moving image regions 401, 402 which are passing each other in opposite but parallel directions. In the example, the upper image region 401 moves from left to right, while the lower image region 402 moves from right to left. Identical motion vectors are each assigned to the individual image blocks of these two image regions 401, 402. In FIG. 5 an image block 41 is shown which represents the image blocks of the first image region 401, to which image block a motion vector V41 is assigned. In FIG. 5 an image block 42 is shown that represents the image blocks of the second image region 402, to which image block a motion vector V42 is assigned. The motion vectors of the two image blocks 41, 42 run parallel to each other. A seam between the oppositely moving regions 401, 402 is identified in FIG. 5 by reference number 403.

When modified motion vectors for the individual image blocks are generated using the above-described procedural steps, a filter is implemented of the motion vectors for the individual image blocks of these two image regions 401, 402, in the direction of motion, in this case in the horizontal direction. In one filtering technique, any "mixing" of the motion vectors of the two oppositely moving regions 401, 402 is avoided.

Figure 6:
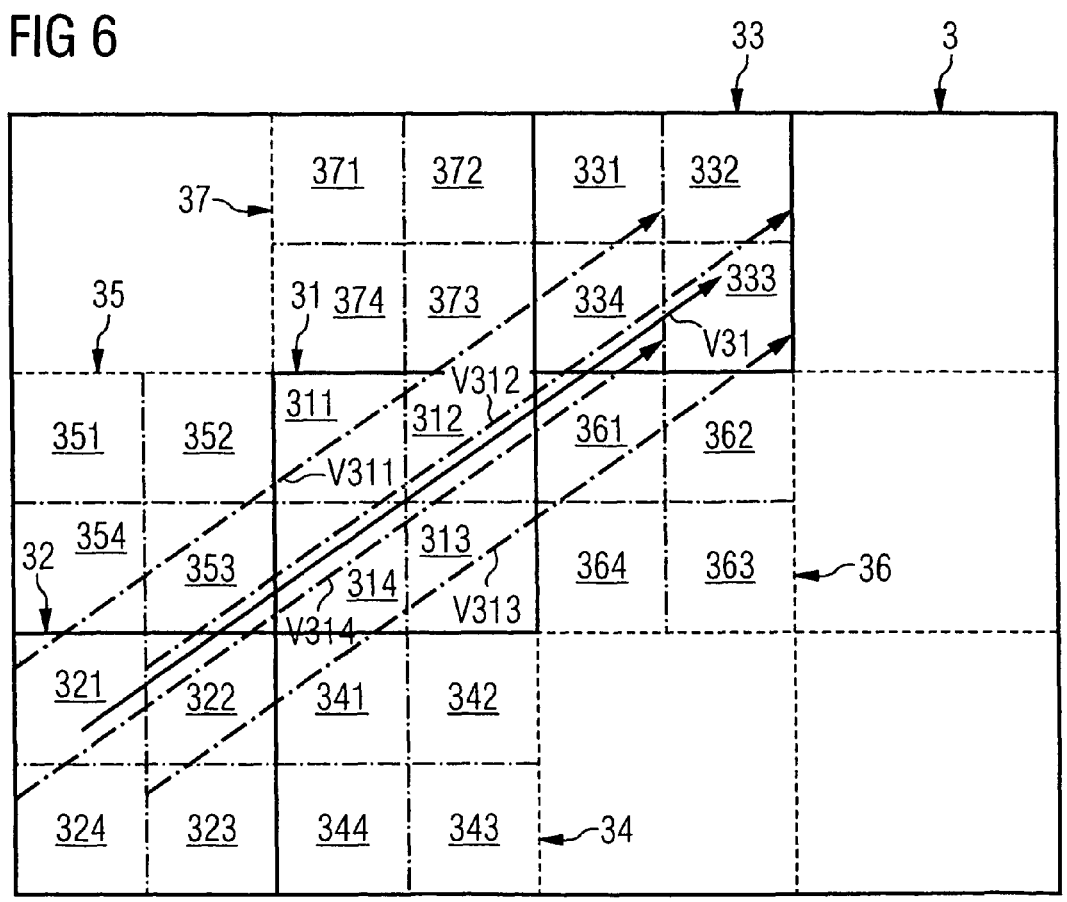
FIG. 6 pictorially illustrates the use of a method according to an aspect of the invention for increasing the resolution during motion estimation.

The filter may also be applied to increase the resolution during motion estimation, as will explained below based on FIG. 6. FIG. 6 pictorially illustrates a segment of the image 3 subdivided into image blocks. Each of these image blocks, hereafter also called main blocks, comprises, in a manner not further elucidated here, an equal number of interconnected pixels. For the motion estimation, it is desirable to select the size of the individual image blocks to which a motion vector is assigned to be as small as possible in order to display with correct motion very small moving objects. However, the computational effort for motion estimation increases as the image blocks become smaller.

In FIG. 6, reference number 31 identifies a first image block to which first motion vector V31 is assigned. This motion vector V31 of the image block 31 may be a motion vector that is determined by a conventional technique or a modified motion vector generated according to an aspect of the present invention.

To increase the resolution of the motion estimation the main block 31 is subdivided into smaller sub-blocks. In the example, the image block 31 is divided into four equal-size sub-blocks identified by reference numbers 311-314. First, a motion vector V311-V314 is assigned to each of these sub-blocks 311-314, which vector corresponds to the motion vector V31 of the first main block 31. A corresponding subdivision into sub-blocks is also implemented for the remaining image blocks of the image 3, although for purposes of clarity this subdivision is shown in FIG. 6 only for image blocks 32, 33, 34, 35, 36, and 37. For each of the sub-blocks obtained by subdividing the original image blocks, a modified motion vector is determined, as explained below for a first sub-block 311 located in the upper left corner of the image block 31.

For this motion vector V311 first assigned to this sub-block 311, which vector matches in absolute value and direction the motion vector V31 of the first image block 31, those sub-blocks are first determined through which this motion vector passes at least partially. In the example, this motion vector originates in the sub-block 321 of the image block 32 and extends through the sub-blocks 354, 353, 352 of the image block 35, the first sub-block 311, the remaining sub-block 312 of the image block 31, sub-block 373 of the image block 37, and sub-block 334 of the image block 33 up to sub-block 331 of the image block 33. Motion vectors are assigned to these individual sub-blocks, which vectors are assigned to the associated main blocks. A modified the motion vector V311' is generated for motion vector V311 as a function of the motion vectors through which the vector V311 passes at least partially. Thus in the example shown, V311 may be expressed as:

$$V311'=f(V321,V354,V353,V352,V311,V312,V373,V334,V331) \quad (6)$$

In an alternative embodiment, only those main blocks are considered for the purpose of determining the modified motion vector V311', which main blocks the motion vector assigned to the sub-block traverses. In this case, the modified motion vector V311' may be expressed as:

$$V311'=f(V32,V35,V31,V37,V33) \quad (7)$$

The determination of the modified motion vector V311' may also be implemented in the manner explained component-by-component in reference to the explanations for FIGS. 2 and 3, and to equations (4a), (4b) as well as (5a), (5b).

In this method as well, a filter function having a low-pass quality, in particular, a mean-value generation, or even a statistical filter, for example, a median filter, is also appropriate as a filter function f(.).

The described technique may also result in different modified motion vectors for the individual sub-blocks of an image block, as is evident from FIG. 6 in the examination of a second sub-block 313 located in the right lower corner of the image block 31. It is true that in regard to absolute value and direction, the motion vector V313 initially assigned to this second sub-block 313 does match the vector of the first sub-block 311. Due to the spatial displacement of these two sub-blocks 311, 313, however, the motion vector V313 of the second sub-block 313 passes through sub-blocks as well as main blocks which the motion vector V311 of the first sub-block does not traverse. As a result, it is possible to take into account other motion vectors when generating modified motion vector V313', which action can produce a result different from that for the modified motion vector V311' of the first sub-block 311.

The described technique can be implemented repeatedly in order to increase the resolution. For example, it is possible to further subdivide the individual sub-blocks into smaller sub-blocks, then to generate modified motion vectors for these additional sub-blocks using techniques of the present invention.

A block diagram illustration of a device for implementing a technique according to an aspect of the invention is illustrated in FIG. 7. This device comprises a motion vector memory 110 in which the motion vectors of the image blocks of an image or image segment are stored. The vector memory 110 has an address input 111 and a data line 112. Address data can be supplied to the memory 110 through the address input 111. Whenever an address datum assigned to an image block is applied to the address input 111, the vector memory 110 outputs the vector data of the motion vector, which data is assigned to this image block, on the data lines 112.

An evaluation unit 120 utilizes the motion vector data to determine at least the starting and ending image blocks of this motion vector, then to output address data for these image blocks at the address output 122. The evaluation unit 120 may also determine other image blocks through which the given examined motion vector passes in addition to the starting and ending image blocks.

A first switching device 140 is connected preceding the address input 111 of the vector memory 110, while a second switching device 150 is connected following the data output 112. The first switching device 140 selectively provides an address datum supplied by the addressing device 160 or the address data provided by the selection unit 120 to the address input 111. The two switching devices 140, 150 are controlled by a control signal S1 supplied by a control device (not shown).

At the start of the procedural steps to generate a modified motion vector, the address datum of the image block is supplied by the addressing device 160 through the switching device 140 to the vector memory 110, for which image block the modified motion vector is to be generated. The vector data supplied by the vector memory 110 for this image block are supplied through the switching device 150 and then to the evaluation unit 120. After the address data of the given image block have been supplied by the addressing device 160 to the vector memory 110, and after the vector data for the associated motion vector have been determined in the evaluation unit 120, the two switching devices 140, 150 are switched. Subsequently, the address data of at least the starting and ending image blocks of the previously determined motion vector are supplied by the evaluation unit 120 to the vector memory 110. The vector data for the motion vectors of at least the starting and ending image blocks are then supplied through the second switching device 150 to a vector filter 170 that uses the vector data of at least the starting and ending image blocks to determine the modified motion vector. This vector filter 170 may be configured, for example, as a low-pass filter and provides the vector data for the modified motion vector at the output 171.

The vector data of the motion vectors to be filtered are supplied, for example serially, by the vector memory 110 to the filter 170. In this case, the filter is designed to filter the serially received vector data to generate the modified motion vector.

After the modified motion vector is generated, the two switching devices 140, 150 are again switched to supply the address data of another image block through the addressing device 160 to the vector memory 110 and to implement once again the described procedural steps for this next image block.

Although the present invention has been illustrated and described with respect to several preferred embodiments thereof, various changes, omissions and additions to the form and detail thereof, may be made therein, without departing from the spirit and scope of the invention.

What is claimed is:

1. A method for determining motion vectors which are assigned to individual image regions of an image, wherein the image is subdivided into a number of image blocks, and a motion estimation technique is implemented to assign at least one motion vector to each of the image blocks where a modified motion vector is generated for at least a first image block comprises the steps of:
- determining at least a second image block through which the motion vector assigned to the first image block at least partially passes;
- generating the modified motion vector as a function of a motion vector assigned to at least the second image block;
- assigning the modified motion vector as the motion vector to the first image block.

2. The method of claim 1, where a starting image block lying at a starting point of the motion vector assigned to the first image block and an ending image block lying at an end point of the motion vector are determined, and in which the modified motion vector is determined as a function of a starting image block motion vector of the starting image block and of an ending image block motion vector of the ending image block.

3. The method of claim 2, where the mean value of the starting and ending image block motion vectors is determined in order to generate the modified motion vector.

4. The method of claim 1, comprising determining traversed image blocks through which the motion vector assigned to the first image block passes at least partially, and determining the modified motion vector as a function of the motion vectors of these traversed image blocks.

5. The method of claim 4, comprising filtering the motion vectors of the traversed image blocks to generate the modified motion vector.

6. The method of claim 1, where the modified motion vector is generated as a function of the motion vector of the first image block.

7. The method of claim 1, mutually orthogonal vertical motion vector ($V11_y$) and horizontal motion vector ($V11_x$) are assigned to the first image block, and in which a modified vertical motion vector and a modified horizontal motion vector are generated for the image block.

8. The method of claim 7, where generating the modified vertical motion vector ($V11''_y$) comprises:
- determining at least one additional image block which the vertical motion vector ($V11_y$) of the first image block traverses at least partially, and to which a vertical and a horizontal motion vector is assigned; and
- generating the modified vertical motion vector ($V11''_y$) as a function of the vertical motion vector of the least one additional image block.

9. The method of claim 7, where generating the modified horizontal motion vector ($V11''_x$) comprises:
- determining at least one additional image block which the horizontal motion vector ($V11_x$) of the first image block traverses at least partially and to which a vertical and a horizontal motion vector is assigned; and
- generating the modified horizontal motion vector ($V11''_x$) as a function of the horizontal motion vector of at least one additional image block.

10. The method of claim 1, comprising:
- subdividing the image blocks of the image into sub-blocks and assigning the modified motion vectors assigned to the image blocks to the individual sub-blocks as motion vectors;
- for at least a first one of the sub-blocks: determining at least a second sub-block which the motion vector of the first sub-block traverses, and generating a modified motion vector as a function of the motion vector assigned to the second sub-block.

11. A method for determining modified motion vectors which are assigned to individual image regions of an image that is subdivided into a number of image blocks, and a at least one initial motion vector is provided for each of the image blocks the method comprising:
- subdividing the image blocks of the image into sub-blocks and assigning the motion vectors assigned to the image blocks to the individual sub-blocks as motion vectors;
- for at least a first one of the sub-blocks, determining at least a second sub-block through which the motion vector of the first sub-block passes at least partially, and generating a modified motion vector as a function of the motion vector assigned to the at least a second sub-block;
- assigning the modified motion vector as a motion vector to the first sub-block.

12. The method of claim 11, where for the first sub-block those sub-blocks are determined which are traversed at least partially by the motion vector assigned to the first sub-block, and in which the modified motion vector is generated as a function of the motion vectors of the traversed sub-blocks or main blocks.

13. The method of claim 12, low-pass filtering the motion vectors of the traversed sub-blocks to determine the modified motion vector.

14. The method of claim 12, linear filtering the motion vectors of the traversed sub-blocks to determine the modified motion vector.

15. The method of claim 14, where nonlinear filtering comprises statistical filtering.

16. A device for generating a motion vector for an image block of an image, comprising:
- a vector memory that stores motion vectors assigned to the image blocks of the image, where the memory comprises an addressing input and a data output;
- an evaluation unit which has a data input and an address output, the data input of the evaluation unit being selectively connectable to the data output of the vector memory, and the address output of the evaluation unit being selectively connectable to the address input of the vector memory, and which is designed for a motion vector of an image block to provide at least the address of a motion vector of a starting image block and an ending image block for the given motion vector in the vector memory;
- a vector filter which is selectively connectable to the data output of the vector memory.

17. The device of claim 16, where the vector filter comprises a low-pass filter.

18. The device of claim 16, comprising an addressing device that is selectively connectable to the address input of the vector memory.

19. The device of claim 18, comprising a first switching device that is connected between the addressing device, the address output of the evaluation unit, and the address input of the vector memory.

20. The device of claim 19, comprising a second switching device that is connected between the data output of the vector memory, the data input of the evaluation unit, and the vector filter.

* * * * *